Nov. 14, 1967  S. B. RONDUM  3,352,080
LAMINATED COUNTERTOP AND METHOD OF PRODUCING THE SAME
Filed Jan. 17, 1963  4 Sheets-Sheet 1

INVENTOR.
SVEND B. RONDUM

INVENTOR.
SVEND B. RONDUM

Nov. 14, 1967 S. B. RONDUM 3,352,080
LAMINATED COUNTERTOP AND METHOD OF PRODUCING THE SAME
Filed Jan. 17, 1963 4 Sheets-Sheet 4

INVENTOR.
SVEND B. RONDUM

United States Patent Office 3,352,080
Patented Nov. 14, 1967

3,352,080
LAMINATED COUNTERTOP AND METHOD
OF PRODUCING THE SAME
Svend B. Rondum, Bradford, Pa., assignor to Plexowood, Inc., Bradford, Pa., a corporation of Pennsylvania
Filed Jan. 17, 1963, Ser. No. 252,132
12 Claims. (Cl. 52—614)

The present invention relates to the laminated tops that are ordinarily included at the top element of a kitchen counter and is concerned primarily with improvements in the countertop structure and process by which it may be made.

A countertop of the type with which this invention is concerned comprises a flat horizontal portion and a rear vertical flange. Each consists of a composite body of wood chips and a resin with a decorative overlay covering the exposed faces. The overlay for the horizontal and vertical parts is an integral one piece affair to eliminate any cracks or crevices at the corner in which dirt or food particles might lodge and to facilitate cleaning.

Heretofore, the composite body of the horizontal and vertical parts have been produced as separate entities. After which they are joined in right angular relation by the addition of appropriate structural elements. The decorative overlay is then added.

With the foregoing conditions in mind the present invention has in view as an important object, the provision of a laminated countertop of the character indicated which includes a horizontal portion and a vertical flange which are connected by a bent strip. This structure presents the advantage of enabling the manufacturer to form both bodies in the same plane in a single press with the two being joined by the strip before bending. After removal from the press, the strip is bent to achieve the right angular relation and this relation is then secured by the addition of rigid structural elements. The decorative overlay is then applied by using an appropriate adhesive and pressure.

Due to the angular construction of the countertop, considerable difficulty has been experienced in maintaining a large supply on hand. With the countertop of the present invention, a large number of the formed units may be stored in their flat condition. Thus, a manufacturer may maintain an inventory of incomplete units on hand and which will occupy only a small space. When orders are received, the unit is finished by bending the joining strip, adding the bracing element and applying the overlay.

Another important advantage attending the countertop of this invention is that all necessity of three dimensional molding is avoided. Both elements of a unit are formed flat and in the same plane. This is a manufacturing process much simpler than three dimensional molding.

An important object of this invention is to provide a countertop comprising a horizontal body and a vertical flange joined by a bent metallic strip and secured in right angular relation by one or more rigid bracing strips anchored to the respective elements. These bracing strips are susceptible of adjustment so that the countertop may be adapted to any particular wall structure.

Another highly important object in view is to provide in the process of producing laminated counters the step of simultaneously forming the horizontal body and vertical flange in a single press with the two being joined by a flat metallic strip that is anchored to the respective elements.

The bodies of the elments making up a countertop are produced in a heated press and under pressure. From the very nature of the operation they must remain in the press an appreciable length of time. A press represents a large amount of capital investment. Thus, another highly important object of the present invention is to provide a method of producing countertops which includes a step of simultaneously forming multiple units in a single press with each unit consisting of the horizontal body and vertical flange in the same plane and joined by a metallic strip. This method of multiple production results in great savings in the manufacturing cost.

Under certain conditions, a second of a countertop will be located at a corner of the kitchen workpiece in which it is included. Such a countertop section, includes, in addition to the usual rear flange or back piece, an end flange which is normal thereto. Should these flanges meet at a simple corner, difficulty would be experienced in applying the overlay with a proper fit. Thus, another important object of the invention is to provide, in a countertop, a corner filler which adapts the countertop to the reception of the overlay.

Various other more detailed objectives and advantages of the invention such as arise in connection with carrying out the above noted ideas in a practical embodiment will in part become apparent and in part be hereinafter stated as a description of the invention proceeds.

The invention therefore comprises a laminated countertop consisting of a horizontal part and a vertical flange with the body of each of these elements made of wood chips and a resin and joined by a bent metallic strip and the right angular relation secured by a rigid bracing strip together with the method of producing the same.

For a full and more complete understanding of the invention reference may be had to the following description and accompanying drawings; wherein, FIGURE 1 is a sectional view through a press depicting the condition after the materials have been charged thereinto.

Figure 8:
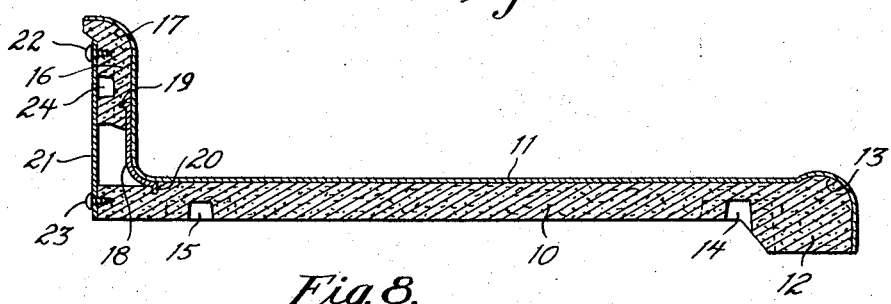
FIGURE 8 is a sectional view through a finished countertop.

It is believed that the present invention is best explained by first describing the structure of a complete countertop unit. Such a unit is shown in FIGURE 8 and includes a horizontal part comprising a body 10 and a decorative overlay 11. The composite body 10 is made of wood chips and a resin as will be later described. It has a thickened front flange 12 the upper exposed corner of which takes the form of a rounded bead 13. Entering into the body from the under face are channels 14 and 15 which constitute means for joining one unit to a next adjacent unit or other elements of the kitchen work piece in which the countertop is included.

A finished unit also includes a vertical flange or back piece 16 made of the same composite material and an exposed front face of which is covered by the overlay 11. The back flange 16 has a rounded corner at 17 which is also covered by the overlay.

A metallic joining strip 18 which may be made of any appropriate metal that is susceptible of bending such as aluminum joins the body 10 and back piece 16. This strip 18 has a flange 19 that is embedded in the back piece 16 and another flange 20 that is embedded in the body 10. A rigid bracing strip 21 has its ends secured to the body 10 and back piece 16 respectively. Thus, a screw shown at 22 secures one end of the brace 21 to the back piece 16 and a second screw 23 secures the strip 21 to the body 10. The strip 21 may be of any appropriate material having the required property of rigidity such as an appropriate steel.

The back piece 16 also has a channel 24 formed on its rear face and this channel performs the same office as the channels 14 and 15.

The composite body

The horizontal body 10 and back piece 16 are composite bodies which are formed by compressing under heat an appropriate mixture of wood chips and a resin. The term "chips" as here employed is intended to embrace sawdust, flakes, splinters, shavings, and chips. Wood in one of these shapes will be present in the final product in a proportion ranging from 75% to 97% by weight.

The resin may have any of the following: Amino-phenolic, polyester, epoxy, phenolic, melamine-urea, urea-formaldehyde, or any of the resins that naturally occur in wood such as lignin. Amino-phenolic is indicated as one of the preferred resins and the resin is present in the finished product in a proportion ranging from 3% to 25% by weight.

If desired, certain other materials may be added to the mixture such as wax and zinc-stearate. These are employed as water proofing agents.

The mixture of resin and wood chips should be introduced into a press, the operating portion of which has a temperature ranging from 275° F. to 450° F. with the preferred temperature being about 300° F.

The press will have an operating pressure from 600 p.s.i. to 6,000 p.s.i. The particular pressure employed will depend upon the desired density in the finished product. This density may range from 25 pounds per cubic foot to 70 pounds per cubic foot.

The process

Figure 1:
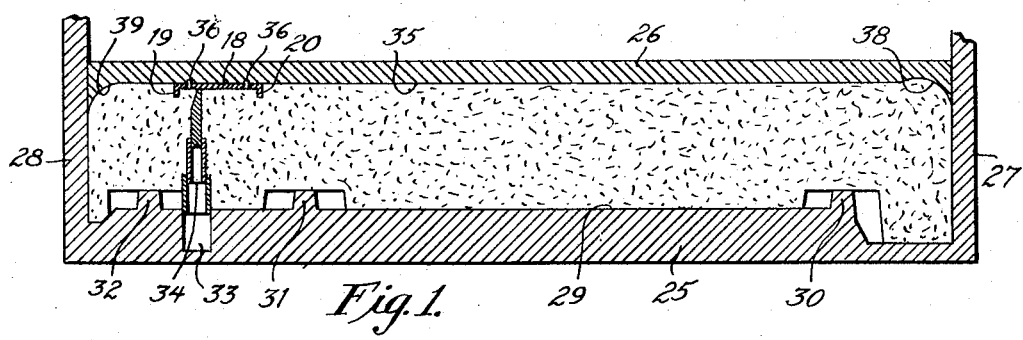

As shown in FIGURE 1, the press includes a female mold part 25 and a male mold part 26. The female mold 25 has side walls 27 and 28 between which the male mold part 26 accurately fits in sliding relation. Upstanding from the inner or top face 29 of the mold part 25 are ribs 30, 31, and 32. The mold part 25 is also formed with a socket 33 which receives a telescopic divider 34.

Figure 9:
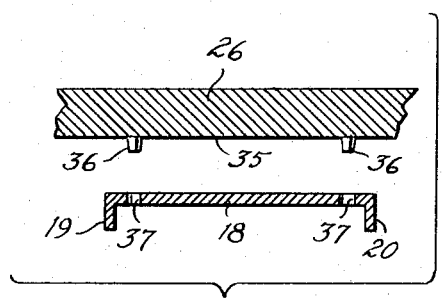
FIGURE 9 is a detail showing a portion of the press and joining strip in exploded relation.

Referring for the moment more particularly to FIGURE 9 the male mold part 26 is shown as carrying on its under face 35, a plurality of pairs of retaining pins 36. These pins hold the strip 18 in position at the beginning of the process. That is, the strip 18 is so secured before bending. The strip 18 has openings 37 which receive the pins 36.

The top mold part 26 has a rounded recess 38 at one end which results in the formation of the bead 13 and a rounded corner 39 at the other end which results in the formation of the rounded corner 17.

The first step of the process may be described by noting that with the mold parts heated to a proper temperature and the joining strip 18 attached to the male mold part, the chip mix is loaded into the female mold section to a preselected depth. This depth will depend upon the thickness of the body required in the final product. As the chip mix is loaded, it is lightly compacted.

The mold is now introduced into the press and full heat is applied. The press is then closed and the ram moves slowly so as to move the male mold parts to its lowermost limit of position as determined by the dead stops (not illustrated). This pressing operation ordinarily will require about 10 minutes with the male mold part 26 being retracted from the dead stops about .005 of an inch during the major portion of this interval.

Figure 2:
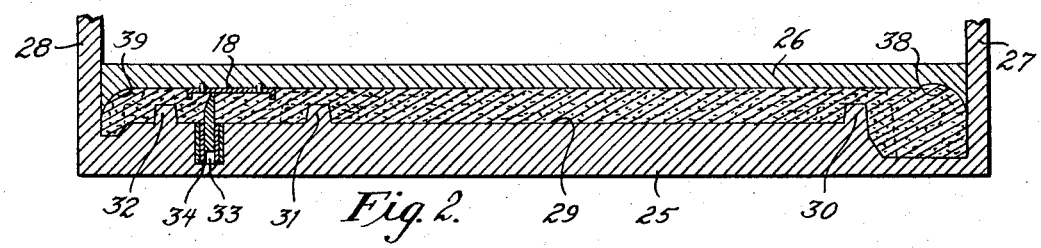
FIGURE 2 is a view similar to FIGURE 1 illustrating the condition of the press after it has been operated to compress the charged materials.

The condition of the mold is depicted in FIGURE 2. It will be noted that the chip mix now fully occupies the space about the channels 30, 31, and 32 and the divider 34 has been partly retracted into the socket 33 leaving just about that much above, the surface 29 which corresponds to the thickness of the compressed mix.

A formed unit in the flat condition illustrated is now removed from the mold and suitably conveyed to a machine for removing the flash which is inevitably formed on the edges.

Figure 3:
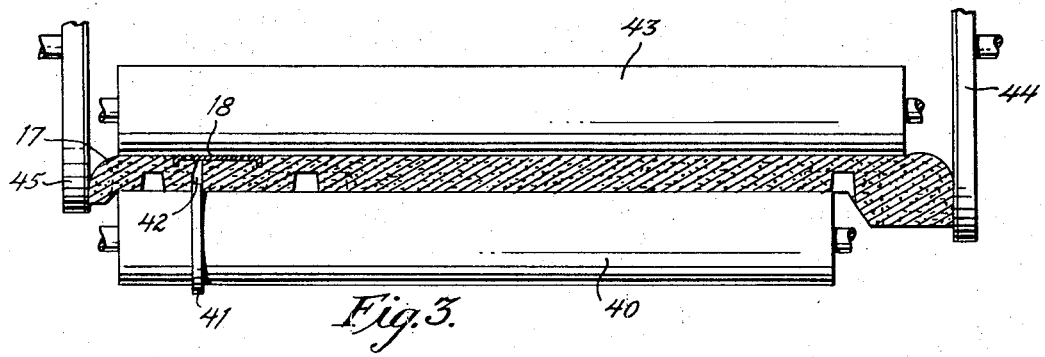
FIGURE 3 is a view illustrating certain elements of a trimming machine in elevation and the formed body of the unit in section.

The flash removal machine is illustrated in FIGURE 3 and comprises a lower roller 40 having an annular rib 41 which is received in the groove 42 that is formed by the divider 34. The roller 40 engages the under face of the formed unit while a second roller 43 engages the top face. Grinding wheels or disc sanders 44 and 45 at the opposite ends grind away the flash and provide finished end edges.

Figure 4:
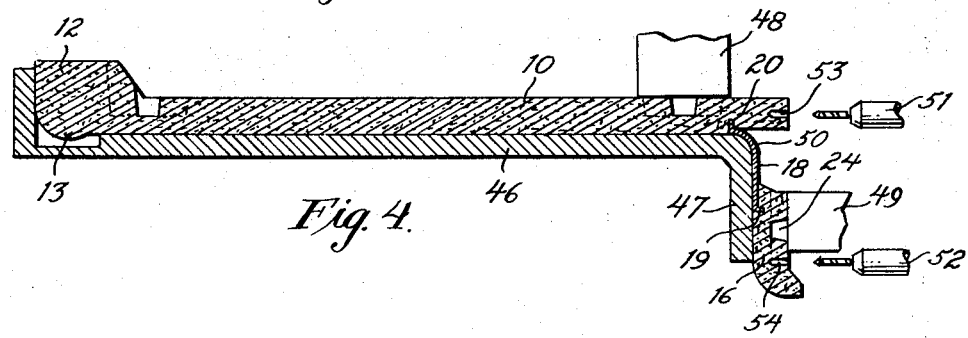
FIGURE 4 shows a unit after the metallic joining strip has been bent.

The next step of the process is to introduce a flat unit to a bending machine. Such a bending machine is shown in FIGURE 4 and includes a bed 46 having a front depending flange 47 normal thereto. An anchoring ram 48 engages the body 10 adjacent to this flange 47. A bending ram 49 engages the back piece 16 and moves it into the position of FIGURE 4 during which operation the strip 18 is bent to provide the bend at 50. It is to be remembered that the flanges 19 and 20 of the strip 18 are embedded in the back piece 16 and body respectively and this anchorage is maintained during and after the bending operation.

While in the bending machine a multiple drill unit including drills 51 and 52 is operated to form the holes 53 and 54 in the body 10 and back piece 16 respectively.

Figure 5:
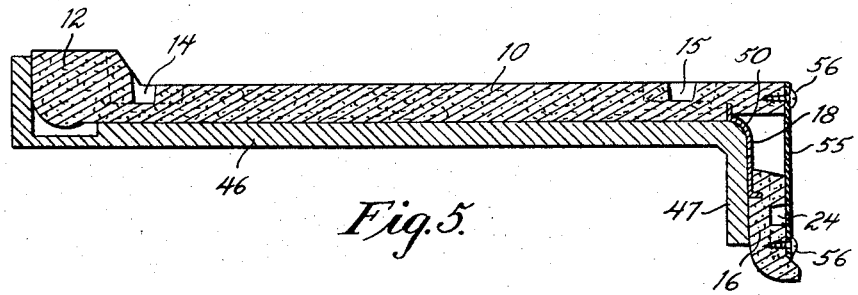
FIGURE 5 is a sectional view showing the application of the rigid bracing strip.

As shown in FIGURE 5 a bracing strip in the form of a steel strap is now applied and secured in position by screws 56 which pass through the strap 55 and into the holes 53 and 54. This strap 55 is of steel having the required property of rigidity to maintain the right angular relation between the back piece 16 and the body piece 10 which has been achieved by the bending operation.

Figure 6:
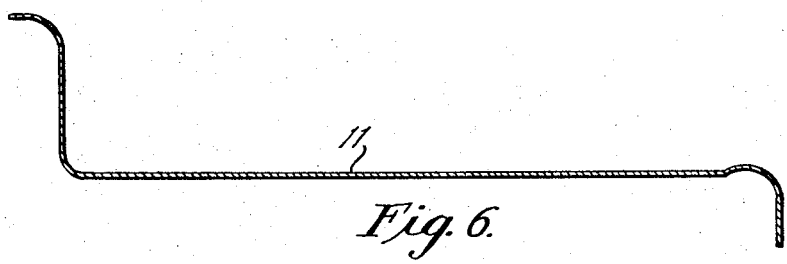
FIGURE 6 is a sectional view through the decorative overlay per se.

The decorative overlay 11 is shown in detail in FIGURE 6. It will ordinarily be preformed and may be made of any appropriate material such as melamine. Obviously, there are many materials which could be employed for the overlay 11 and melamine is merely taken as an example. A good example of the decorative overlay 11 would be laminated paper sheets impregnated with phenolic resin and covered with a thin layer of alpha-cellulose. The better covering would be in the order of .03 of an inch. Other examples of the overlay would be linoleum and leather.

Figure 7:
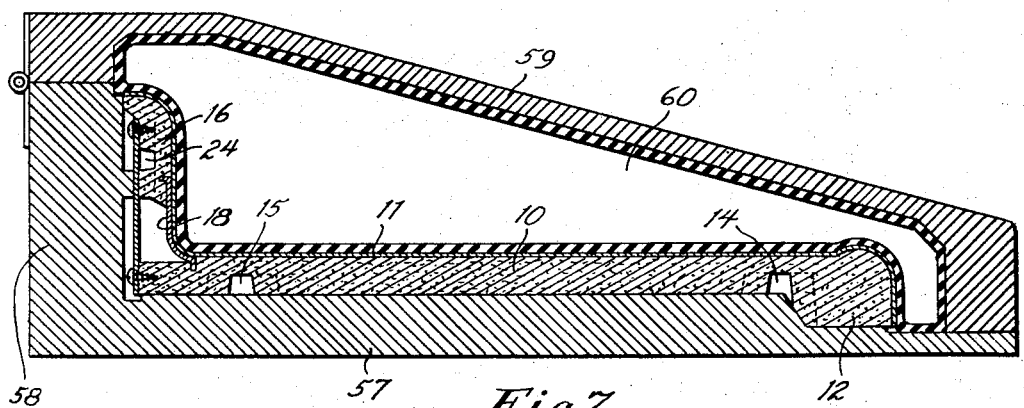
FIGURE 7 is a sectional view through an air pressure machine that is employed to apply the overlay.

An air press is depicted in FIGURE 7. It comprises a bottom member 57 having an end wall 58 to which is hinged a cover 59. Between the bottom 57 and cover 59 there is an air bag 60. The unit in the condition depicted in FIGURE 5 is now introduced to the air press and the exposed faces sprayed with an appropriate adhesive. Polyvinyl acetate is an example of an adhesive which may be employed. The overlay 11 is then positioned in the manner illustrated in FIGURE 7 whereupon the air bag 60 is placed in position and the cover 59 closed.

Air under pressure is now introduced into the bag 60 to firmly seal the overlay in position.

The multiple process

As mentioned above, a press represents a large capital investment and it is desirable to form a plurality of units in a single operation in a press.

Figure 12:
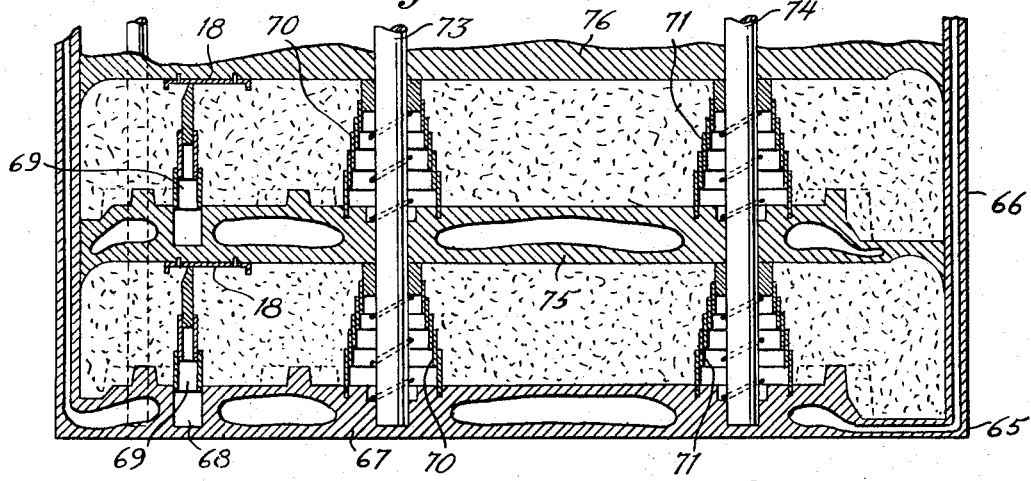
FIGURE 12 is a section through a multiple press that will accommodate a plurality of units and illustrates the condition before the application of pressure.
Figure 13:
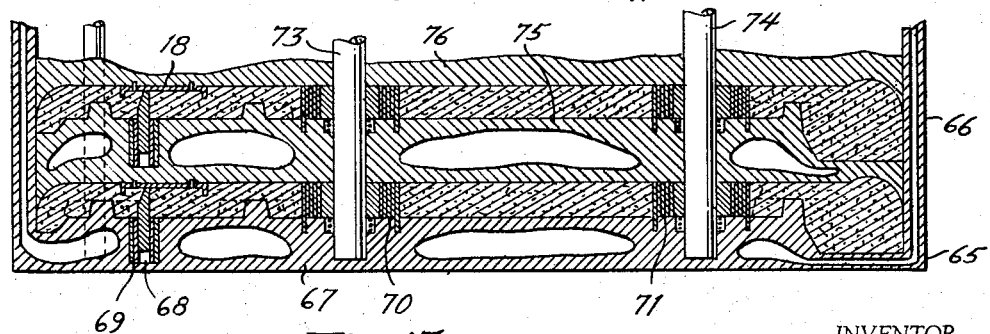
FIGURE 13 is a sectional view of the press of FIGURE 12 after the units have been pressed.

Referring to FIGURE 12, a female mold part is designated at 65. It has side walls 66 of sufficient extent to accommodate the number of units which are to be formed. The bottom wall of the female mold part which is depicted at 67 is formed with the usual socket 68 which accommodates the telescopic divider 69. A pair of telescopic stops 70 and 71 are also included. Extending through these stops are guide rods 73 and 74.

The male mold parts are shown at 75 and 76. Each of these male mold parts 75 will carry one of the strips 18 in the manner above described. All of the male mold parts except the uppermost will have a structure corresponding to the bottom 67 of the female mold and it will also carry the same elements of this member such as the telescopic divider 69 and the stops 70 and 71.

After the units have been removed from the mold, the apertures which are formed by the rods 73 and 74 may be filled by plugs.

The corner filler

Figures 14, 15:
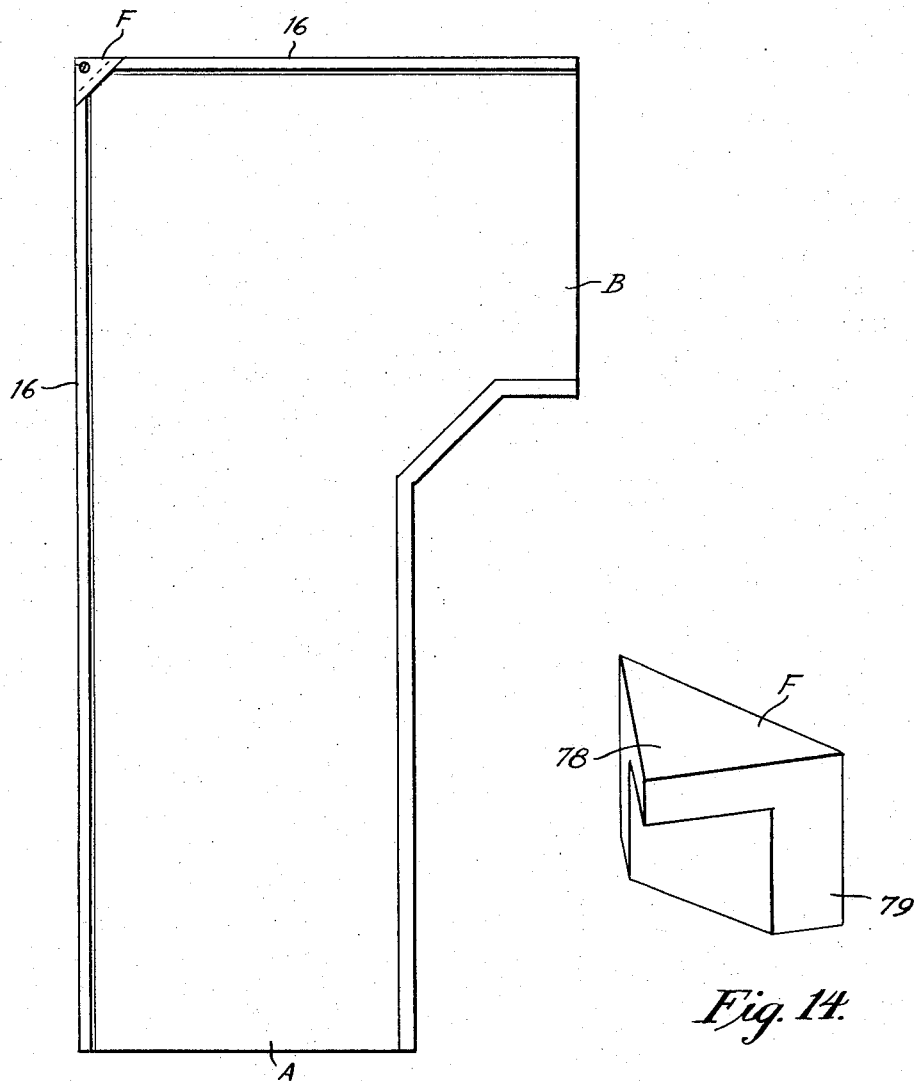
FIGURE 14 is a detail of a corner filler.
FIGURE 15 is a plan view showing the corner filler as applied to the miter joint between two meeting countertops.

Referring now more particularly to FIGURES 14 and 15, a countertop is shown as including two portions, A and B, which are normal to one another. They are formed as a one piece integral unit and each includes a rear flange or back piece 16 with the two being in right angular relation. Each of these back pieces stop short of the corner of the horizontal body of the countertop.

A corner filler is designated F and includes a triangularly shaped portion 78 and an upright portion 79. This filler F is secured in position in any preferred manner. The upright 79 spans the gap between the ends of the flanges 16. Thus an abrupt corner is avoided. In the drawing, the upright portion 79 of the corner filler is shown as a plain strip having an inner flat face. Obviously, this face could be curved if desired or necessary to accommodate the overlay.

Figure 10:
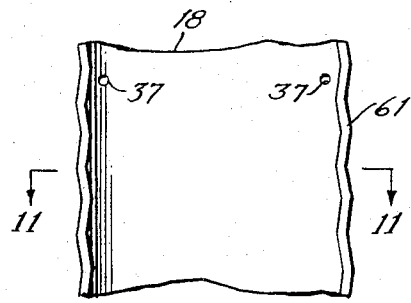
FIGURE 10 is a bottom plan view of a modified form of the joining strip.
Figure 11:
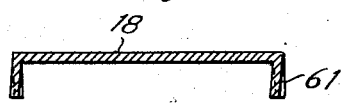
FIGURE 11 is a section through the strip of FIGURE 10 being taken about on the plane represented by the line 11—11 of FIGURE 10.

FIGURES 10 and 11 depict a modification of the strip 18. In this form, the anchoring flanges 61 are wavy or corrugated so as to provide a better anchorage when embedded in the respective elements.

While preferred specific embodiments of the invention are hereinbefore set forth, it is to be clearly understood that the invention is not to be limited to the exact construction, steps, and materials illustrated and described because various modifications of these details may be provided in putting this invention into practice within the purview of the appended claims.

What is claimed is:

1. In a countertop, a horizontal member of composite material, a vertical flange of composite material, a strip joining said member and flange, said strip having one edge embedded in the top surface of the horizontal member and the opposite edge embedded in the vertical member and said flange, said member and flange having been formed as a substantially flat unitary member with said strip, said member and flange being separated intermediate the edges of said strip and bent about said strip, said bend defining a corner between the two.

2. The countertop of claim 1 in which the composite member and flange is a compressed mixture of wood chips and a resin.

3. In a laminated countertop, a horizontal member of composite material, a vertical member of composite material, a strip connecting said members, said strip having one edge embedded in the top surface of the horizontal member and the opposite edge embedded in the vertical member said horizontal member and said vertical member having been formed as a substantially flat unitary member with said strip embedded, therein, said member being separated intermediate the edges of said strip and bent about said strip, said bend defining the corner between said members.

4. In a laminated countertop, a horizontal member of composite material, a vertical member of composite material, a strip connecting said members, said strip having one edge embedded in the top surface of the horizontal member and the opposite edge embedded in the vertical member, said horizontal member and said vertical member having been formed as a substantially flat unitary member with said strip embedded therein, said members being separated intermediate the edges of said strip and bent about said strip, said bend defining the corner between said members, and a rigid bracing strip anchored to an edge of said horizontal member, and the face of said vertical member.

5. In a laminated countertop, a horizontal member of composite material, a vertical member of composite material, a strip connecting said members, said strip having one edge embedded in the top surface of the horizontal member and the opposite edge embedded in the vertical member, said horizontal member and said vertical member having been formed as a substantially flat unitary member with said strip embedded therein, said members being separated intermediate the edges of said strip and bent about said strip, said bend defining the corner between said members, and a decorative overlay covering the upper face of said horizontal member, said bend, and the inner face of said vertical member.

6. In a laminated countertop, a horizontal member of composite material, a vertical member of composite material, a strip connecting said members, said strip having one edge embedded in the top surface of the horizontal member and the opposite edge embedded in the vertical member, said horizontal member and said vertical member having been formed as a substantially flat unitary member with said strip embedded therein, said members being separated intermediate the edges of said strip and bent about said strip, said bend defining the corner between said members, a rigid bracing strip anchored to an edge of said horizontal member and the outer face of said vertical member and a decorative overlay covering the upper face of said vertical member, said bend, and the inner face of said vertical member.

7. In the production of a laminated countertop, the method including the step of simultaneously molding a horizontal member and back piece in a common plane, and simultaneously anchoring a joining strip to said member and back piece by embedding one edge of said strip in the top surface of the horizontal member and the opposite edge in said back piece.

8. In the production of a laminated countertop, the method comprising the steps of simultaneously compressing a mixture of wood chips and resin under heat to simultaneously form horizontal and back members and at the same time anchoring a joining strip to said members by embedding a flange on one edge of said strip in the top surface of the horizontal member and the opposite edge in said back member.

9. In the production of a laminated countertop, the method comprising the steps of simultaneously compressing a mixture of wood chips and resin under heat to simultaneously form horizontal and back members and at the same time anchoring a joining strip to said members by embedding a flange on one edge of said strip in the top surface of the horizontal member and the opposite edge in said back member, and then bending said strip to cause said members to assume a right angular relation.

10. In the production of a laminated countertop, the method comprising the steps of simultaneously compressing a mixture of wood chips and resin under heat to simultaneously form horizontal and back members and at the same time anchoring a joining strip to said members by embedding a flange on one edge of said strip in the top surface of the horizontal member and the opposite edge in said back member, then bending said strip to cause said members to assume a right angular relation and then affixing a rigid bracing strip in position to secure said relation.

11. In the production of a laminated countertop, the method comprising the steps of simultaneously compressing a mixture of wood chips and resin under heat to simultaneously form horizontal and back members and at the same time anchoring a joining strip to said members by embedding a flange on one edge of said strip in the top surface of the horizontal member and the opposite edge in the said back member and then applying a decorative overlay over the upper face of said horizontal member, the said strip, and the inner face of said back member.

12. In a countertop, a composite body having portions extending normal to one another with each of said portions presenting a rear edge and with the rear edges defining a corner, a joining strip along each of said rear edges and having a flange at one edge embedded in the top surface of said body, a rear flange of a composite body secured to each of said joining strips with the joining strip having a flange at the opposite edge embedded in each of said rear flanges, each of said strips having a bend establishing a right angularly relation between each rear flange and said horizontal body, said rear flange stopping short of said corner, and a corner filler secured to said horizontal body at said corner and an upright bridging the space between said rear flanges.

References Cited

UNITED STATES PATENTS

| | | | |
|---|---|---|---|
| 1,276,624 | 8/1918 | Cummings | 264—251 |
| 2,331,296 | 10/1943 | Bendix | 264—93 |
| 2,674,768 | 4/1954 | Everhart et al. | 52—631 |
| 2,859,795 | 11/1958 | Greig | 161—40 |
| 2,981,580 | 4/1961 | Hansen | 108—27 |
| 3,149,187 | 9/1964 | Wood | 156—212 |

EARL M. BERGERT, *Primary Examiner.*

W. E. HOAG, *Assistant Examiner.*

UNITED STATES PATENT OFFICE
CERTIFICATE OF CORRECTION

Patent No. 3,352,080  
November 14, 1967

Svend B. Rondum

It is hereby certified that error appears in the above numbered patent requiring correction and that the said Letters Patent should read as corrected below.

Column 4, line 42, after "body" insert -- 10 --; column 5, line 73, after "member", first occurrence, insert a comma; line 75, for "member", second occurrence, read -- members --; line 75, for "embedded," read -- embedded --.

Signed and sealed this 7th day of January 1969.

(SEAL)  
Attest:

Edward M. Fletcher, Jr.  
Attesting Officer

EDWARD J. BRENNER  
Commissioner of Patents